United States Patent [19]

Burdekin

[11] Patent Number: 5,052,115
[45] Date of Patent: Oct. 1, 1991

[54] ACCURACY TESTING DEVICE

[75] Inventor: Melvyn Burdekin, Hyde, United Kingdom

[73] Assignee: C. D. Measurements Limited, United Kingdom

[21] Appl. No.: 541,272

[22] Filed: Jun. 20, 1990

[51] Int. Cl.$^5$ .............................................. G01B 7/31
[52] U.S. Cl. .................................................. 33/502
[58] Field of Search ...................... 33/502, 567, 567.1, 33/503

[56] References Cited

U.S. PATENT DOCUMENTS

| 4,435,905 | 3/1984 | Bryan | 33/613 |
| 4,884,348 | 12/1989 | Zeller et al. | 33/502 |

FOREIGN PATENT DOCUMENTS

| 895514 | 5/1962 | United Kingdom . |
| 1272627 | 5/1972 | United Kingdom . |

Primary Examiner—Harry N. Haroian
Attorney, Agent, or Firm—Pravel, Gambrell, Hewitt, Kimball & Krieger

[57] ABSTRACT

A testing device for testing the setting accuracy of a machine by measuring the spacing of a first machine locus with respect to a second machine locus at at least two points on a circular arc, comprises a first, ball-ended probe adapted to be fixed to one part of the machine with the center of the ball representing said one locus. A second such probe is adapted to be fixed to another part of the machine with the center of the ball representing the second locus, interconnecting means for interconnecting said ball ends at a predetermined spacing in mountings permitting relative rotation of the ball ends with respect to the interconnecting means, at least one single axis transducer for sensing the displacement of one ball end, and computing means for calculating from the transducer output the deviation from a precise arcuate path of the first ball-ended probe.

3 Claims, 1 Drawing Sheet

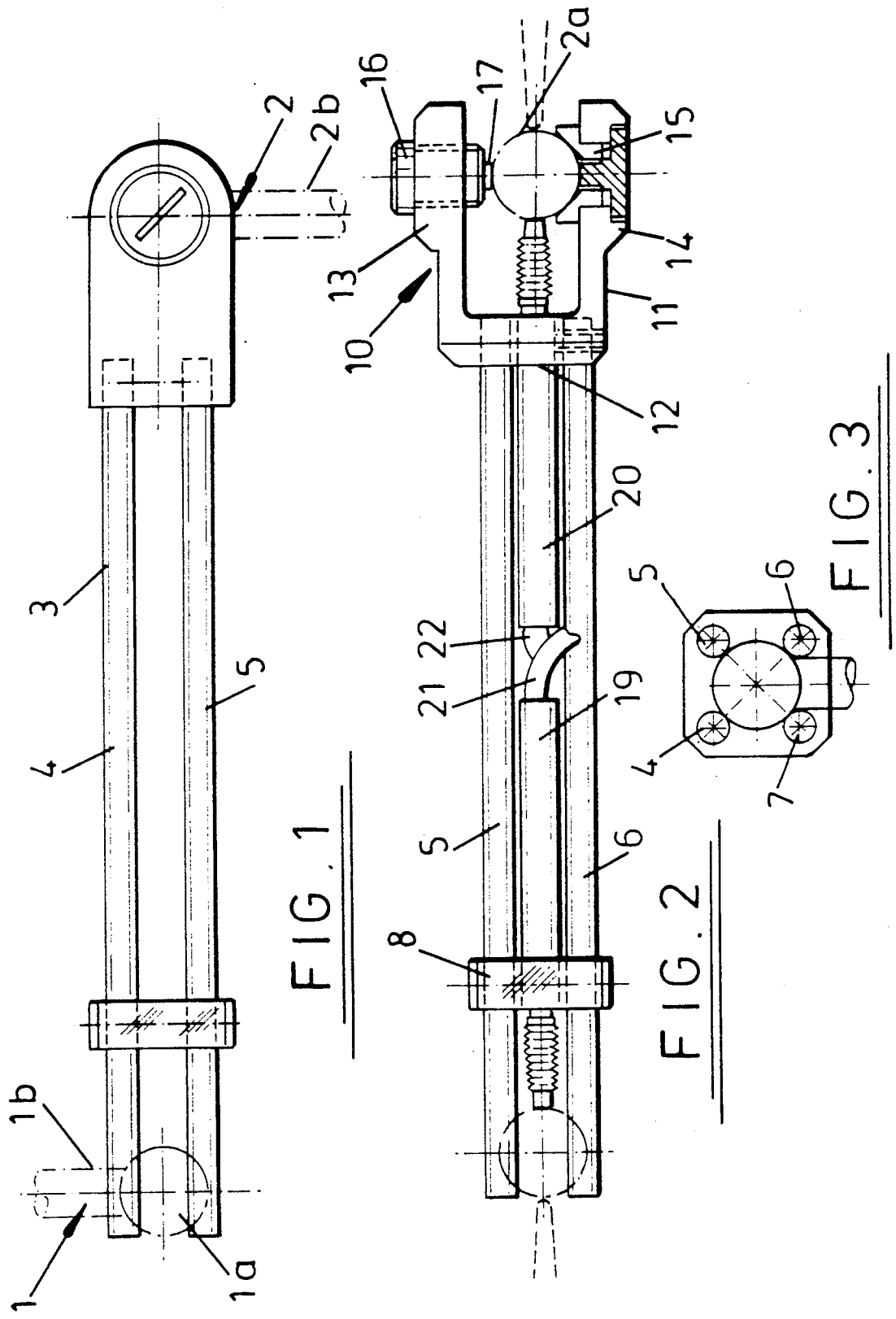

ACCURACY TESTING DEVICE

This invention relates to an accuracy testing device and more particularly to a device for testing the setting accuracy of a machine e.g. a machine tool, a coordinate measuring machine or a robot device, by the conventional technique of causing a first locus on one part of the machine to travel about a centre defined by a second locus on another different part of the machine and measuring any variation in the spacing of said loci, e.g. in the case of a machine tool the first locus may simulate the tool point while the second locus may be on the machine tool bed. The first locus may travel continuously on a circular or part-circular path about said centre or, alternatively, measurements may be taken at discrete intervals on said path. Another possibility on a suitable machine is to make measurements at discrete points on a spherical surface having the second locus at its centre.

It has been previously proposed to cause a probe attached to said one machine part to travel around the circular periphery of a disc fixed to the other machine part, the probe incorporating a two-dimensional transducer arranged to measure deviations from the circular path. This technique has disadvantages in that it requires an accurately machined disc in order to predefine a precise circular path, secondly the technique is somewhat cumbersome if corresponding measurements are to be made in three mutually perpendicular planes since it may be difficult to position the disc accurately in each plane; and, finally, two-dimensional transducers are an expensive component.

It has also been proposed to measure the spacing between said loci using a ball-ended telescopic rod incorporating a single-axis transducer monitoring the spacing between the centres of the balls which are mounted on holders attached to the respective machine parts. This device has the disadvantage that inaccuracies may be introduced by the mountings of the balls in the holders.

It is an object of the present invention to obviate or mitigate the aforesaid disadvantages.

According to the present invention there is provided a testing device for testing the setting accuracy of a machine by measuring the spacing of a first machine locus with respect to a second machine locus at at least two points on a circular arc, comprising a first, ball-ended probe adapted to be fixed to one part of the machine with the centre of the ball representing said one locus, a second such probe adapted to be fixed to another part of the machine with the centre of the ball representing the second locus, interconnecting means for interconnecting said ball ends at a predetermined spacing in mountings permitting relative rotation of the ball ends with respect to the interconnecting means, at least one single axis transducer for sensing the displacement of one ball end, and computing means for calculating from the transducer output the deviation from the precise arcuate path of the first ball-ended probe.

Preferably, a second single-axis transducer is provided for sensing any displacement of the second ball-ended probe with respect to the interconnecting means.

The invention will now be further described by way of the example only, with reference to the accompanying drawings, in which;

FIG. 1 is a plan view of one embodiment of testing device according to the invention;

FIG. 2 is a corresponding side elevation, and

FIG. 3 is an end view from the left in FIGS. 1 and 2.

Referring now to the drawings, the testing device comprises a first ball-ended probe 1 fixed for example to the machine spindle of a machine tool, a second ball-ended probe 2 attached for example by a magnetic base to the work holder of the machine tool and interconnecting means 3 for interconnecting the ball ends 1a, and 2a of the two probes. The ball ends 1a, 2a are made of tungsten carbide and are available accurately dimensioned and at low cost from specialist manufacturers. The ball ends 1a, 2a are fixed to ends of posts 1b, 2b aforesaid machine components.

The interconnecting means 3 comprises four carbon fibre round bars 4, 5, 6 and 7 held in square array by a spacer 8 with holes in which the bars are fixedly received. At the left-hand end of the interconnecting means 3 the ends of the bars 4–7 are free to permit the bars to be located over the ball end 1a. The spacing of the bars 4–7 is such that the ball end 1a is a close sliding fit therebetween so as to make four-point contact therewith as illustrated in FIG. 3. At the right hand end the interconnecting means 3 has a mounting means 10 comprising a yoke 11 with a base 12 and side limbs 13, 14. The bars 4–7 are fixed in corresponding holes in the base 12 of the yoke 11. The side limb 14 of the yoke 11 has a conical seat 15 for the ball end 2a and the side limb 13 has a screw-in bolt 16 incorporating a spring-loaded plunger 17 for urging the ball end 2a into its seat 15. The bars 4–7 are made of carbon fibre for stiffness and lightness and in order to reduce thermal effects caused by contraction and expansion of the interconnecting means 3. The spacer 8 and the mounting means 10 are made of aluminium for lightness. Two single-axis displacement transducers 19, 20 are mounted in the space between the bars 4–7 and have their spring-loaded sensor ends contacting the ball ends 1a, 2a respectively and their bodies centrally located in bores in the spacer 8 and the base 12 respectively with the possibility of relative adjustment by sliding in the respective bearing before being fixed in position by a respective set screw one of which is indicated in dotted line in the case of the mounting means 10. Such single-axis transducers are well known and readily available commercially and will therefore not be further described. The transducer output leads 21, 22 are connected to a computer which is programmed to derive the deviation from a precise circular path of the ball end 1a with respect to the ball end 2a, any inaccuracies resulting from the mounting 10 being eliminated by the action of the transducers 20 and 19. It will be appreciated that if the mounting 10 is considered to be sufficiently accurate the second transducer 20 may be dispensed with.

In use of the illustrated embodiment, the effective length of the device may be present by using a setting fixture on which are mounted dummy probes having ball ends at predetermined distances apart. The interconnecting means is connected between two selected ball ends at say 200 mm apart and the two transducers are mutually adjusted into contact with the respective ball ends so as to give a zero reading at this spacing. The set screws are then tightened to fix the transducers in position and the interconnecting means can then be mounted on the actual probes that have previously been fixed to the appropriate parts of the machine whose accuracy is to be tested. One of the ball-ended probes may now be moved relative to the other ball-ended probe in the manner already described in the introduction for the two machine loci whose spacing is to be checked. Deviations in the measured length are detected by the transducers and the computer is programmed to give an appropriate readout.

It will be appreciated that variations may be made without departing from the scope of the invention. For example, the conical seat 15 may be replaced by a three-point seating afforded by three spherical protrusions.

Instead of two single-axis displacement transducers there may be four such transducers with the additional two transducers mounted externally of each end of the device illustrated in FIG. 2 such that the sensor ends of the additional transducers engage the respective ball ends 1a, 2a in diametrical opposition to the internal transducers 19, 20 as illustrated in dotted line in FIG. 2. Although use of the testing device is now confined to two dimensions this arrangement makes for very high accuracy partly because four sets of data are now computable and partly because errors in the spherical accuracy of the ball ends can be compensated.

I claim:

1. A testing device for tsting the setting accuracy of a machine by measuring the spacing of a first machine locus with respect to a second machine locus at at least two points on a circular arc, comprising a first, ball-ended reference element adapted to be fixed to one part of the machine with the center of the ball representing the first locus, a second, ball-ended reference element adapted to be fixed to another part of the machine with the center of the ball representing the second locus, interconnecting means for interconnecting said ball ends of the reference elements in respective mountings and permitting relative rotation of the ball ends with respect to said interconnecting means, the mounting of said respective mountings for said first element ball end permitting relative movement of said first element ball end and said interconnecting means, and the mounting of said respective mountings for said second element ball end being at a fixed position on said interconnecting means, a single axis transducer for directly sensing the surface of said ball end of said first reference element to detect displacement thereof relative to said second reference element, and computing means for calculating from the output of said transducer the deviation from a precise arcuate path of the first locus.

2. A testing device as claimed in claim 1, wherein a further single-axis transducer is provided for sensing any displacement of said second ball-ended reference element with respect to said interconnecting means.

3. A testing device as claimed in claim 1, wherein said interconnecting means comprises four rods held in square array with free ends defining the mounting for said first reference element.

* * * * *